(12) United States Patent
Herr

(10) Patent No.: US 8,100,023 B2
(45) Date of Patent: Jan. 24, 2012

(54) ROTARY POSITIVE DISPLACEMENT FLOWMETER

(75) Inventor: Vince Herr, Overland Park, KS (US)

(73) Assignee: Liquid Controls, LLC, Lake Bluff, IL (US)

( * ) Notice: Subject to any disclaimer, the term of this patent is extended or adjusted under 35 U.S.C. 154(b) by 214 days.

(21) Appl. No.: 12/685,499

(22) Filed: Jan. 11, 2010

(65) Prior Publication Data

US 2011/0167903 A1 Jul. 14, 2011

(51) Int. Cl.
*G01F 1/28* (2006.01)

(52) U.S. Cl. .................................... 73/861.74

(58) Field of Classification Search ............... 73/861.77, 73/861.74, 861.73
See application file for complete search history.

(56) References Cited

U.S. PATENT DOCUMENTS

| 2,835,229 | A | * | 5/1958 | Richards | 418/7 |
| 3,482,446 | A | * | 12/1969 | Wrinkle et al. | 73/257 |
| 4,887,943 | A | * | 12/1989 | Kobayashi et al. | 417/295 |

* cited by examiner

*Primary Examiner* — Jewel V Thompson

(57) ABSTRACT

A rotary positive displacement flowmeter of the type utilizing two displacement rotors and a blocking rotor with the blocking rotor having a single recess and the displacement rotor cylinders being of substantially similar size as the blocking rotor, resulting in a uniform flowpath through the flowmeter with alignment of the rotor axes in a 180 degree plane.

22 Claims, 9 Drawing Sheets

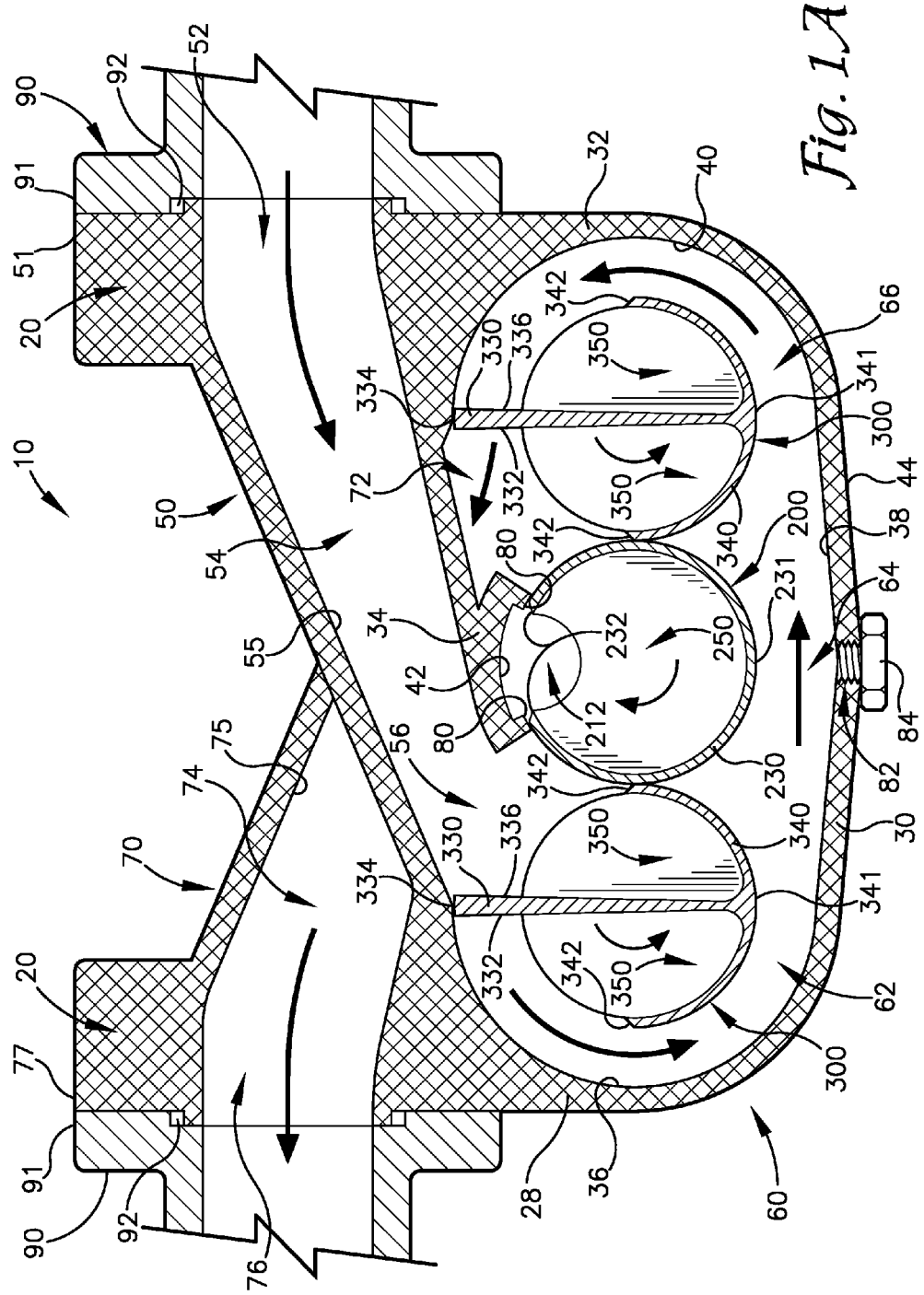

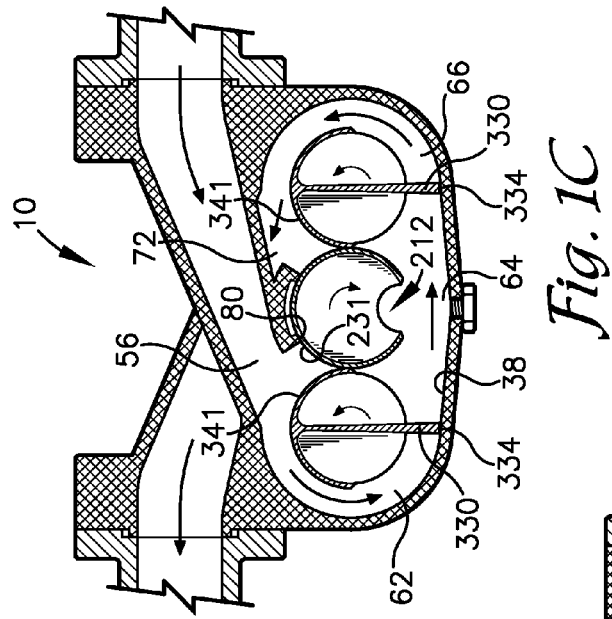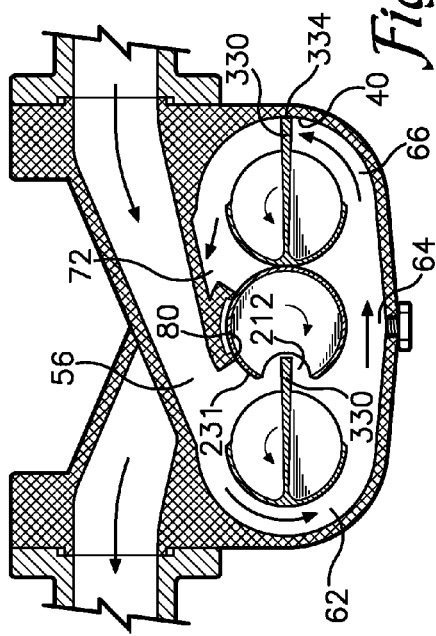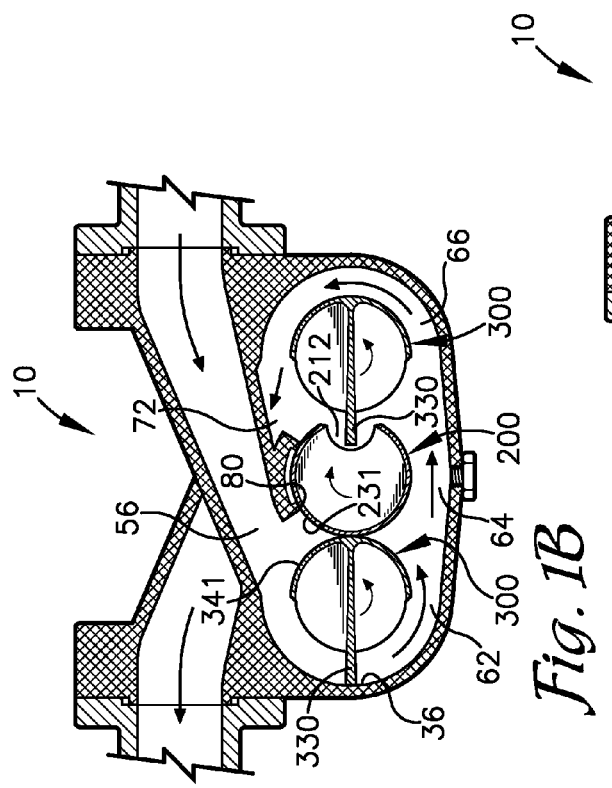

ROTARY POSITIVE DISPLACEMENT FLOWMETER

FIELD OF THE INVENTION

The present invention relates to flowmeters, and more particular to rotary positive displacement flowmeters utilizing multiple displacement rotors and a blocking rotor.

BACKGROUND OF THE INVENTION

Positive displacement flowmeter are well known in the art. Specifically, such a device is used in various applications within widespread industries, including the petrochemical and natural gas industries. The general purpose of a flowmeter is to measure the quantity of a substance, typically a gas or a liquid, flowing through the meter such that the amount of the substance can be readily and accurately determined.

Typically, a substance flows through a conduit or line designed to move the substance from one point to another. Where applicable, the conduit is separated and a flowmeter is attached and, in many instances, the entire flow path of the substance is then diverted through the flowmeter. The movement of the substance through the flowmeter causes the meter contained within the flowmeter apparatus to measure and/or record the quantity of substance moving through the flowmeter.

Given the typical application of a flowmeter, accuracy, flow volume and energy efficiency are important. It is desirable for the flowmeter to be accurate and measure precisely the amount of substance moving through the meter. In industrial settings, it is also desirable for the flowmeter to be able to accommodate an increased flow rate to maximize production and/or operations without jeopardizing the integrity and/or accuracy of the flowmeter.

The flow rate of the substance impacts factors that contribute to the longevity of a flowmeter, specifically pressure drop, cyclical pressure drop fluctuation and vibration. Over time these factors can damage the flowmeter thus decreasing both the accuracy of the meter and its longevity. When a flowmeter is damaged or ceases to work properly, the flow of the substance either has to be stopped or diverted so that the flowmeter can be detached from the conduit segments and a new flowmeter attached. Such downtime can significantly disrupt industrial operations.

Pressure drop and vibration generally increase with flow rate. Therefore, the structural design of the flowmeter, in as much as the design contributes to the degree of pressure drop and vibration, imposes a maximum flow rate on a flow meter above which accuracy and longevity is compromised. At a certain level of pressure fluctuation or vibration intensity, mechanical stresses will distort or flex the shapes of the rotors and/or the housing enough to allow unmetered flow, i.e. slippage, between the rotors and/or between the rotor and the housing, and/or cause physical damage to the bearing and other meter components, all directly impacting the accuracy and longevity of the meter.

A number of sources contribute to the pressure drop and vibration of a flowmeter as currently available in the art. First, in general, a flow path that is straight is only impeded by the friction exerted by the walls of the conduit and can move fluidly. However, as angles or turns are introduced into the path, which is typical in such applications, extra work is required to overcome inertia and the substance is met with increased friction at such angles or turns requiring greater energy to drive the device. The degree to which the flow of the substance is impacted or influenced depends on the degree of the angle or turn. The greater the degree of the turn, the greater the resistance.

The same principle is applicable for the flowmeter and the flow of substance through the flowmeter. A flowmeter that creates, by virtue of its structure, more turns and angles of the flow path will have greater pressure drop compared to a flowmeter with less turns and angles, other factors being equal. It is therefore desirable to have a flowmeter that creates a smooth, fluid flow path that minimizes turns and angles.

The second factor is the blocking rotors which impact flow in two ways, namely by virtue of both placement and design. In existing art designs, the blocking rotor is placed between the inlet and outlet in such a manner that the blocking rotor itself obstructs the inlet and outlet ports. The location of the blocking rotor within the flow path obstructing the flow generates cyclical vibrations that are undesirable. Therefore, it is desirable to position the blocking rotor such that it minimizes interference with the flow path.

Positioning the blocking rotor more directly between the displacement rotors decreases the interference with the inlet and outlet flows by the blocking rotor, a common problem existing in the art. It is desirable to increase the displacement rotor hub radius to substantially the same size as the blocking rotor radius to uniformly align the blocking rotor between the displacement rotors, reducing and/or eliminating the extent to which the blocking rotor interferes with the flow path. In a given housing size, the larger displacement rotor hub means shorter displacement rotor blades. In prior art, displacement rotor blade length was maximized to make the flow path as wide as possible in a given housing size. However, it is desirable to back away from maximum displacement rotor blade length in favor of reduced blocking rotor interference in the flow path, less turbulence inside and outside of the blocking rotor and improved efficiency. This is a trade off not seen in the prior art. The displacement rotor blades in prior models by Kolb and Richards extend to nearly the center of the blocking rotor, where the preferred embodiment displacement rotor blades reach less than half way to the center of the blocking rotor center, thus generating less turbulence inside the blocking rotor.

Regarding the blocking rotor design, current blocking rotors in the art have multiple recesses or cavities. The use of multiple cavities requires the blocking rotor structure to have a web(s) or wall(s) between the cavities. During the rotation of the blocking rotors, the flow confronts these walls which generate turbulence and vibrations in the meter.

Blocking rotors known in the art teach away from having a single cavity blocking rotor, as discussed in more detail later. However, a single cavity blocking rotor reduces the turbulence and vibrations in the meter by eliminating the rotating interior web surface which reduces turbulence, and reduces the work required to rotate the blocking rotor, and makes the flow path more stable with decreased points of fluctuation in flow from structural events. Therefore, it is desirable to maximize the efficiency of the blocking rotor by having only one cavity.

A third factor is that some displacement rotors are not balanced around their axis of rotation. This contributes to additional vibration and damage to the flowmeter. It is desirable to have balanced displacement rotors to minimize vibration.

All four of the sources described above, as well as others, contribute to the negative effects associated with increased flow rate such that a maximum useful flow rate is intrinsically imposed on the flowmeter simply by virtue of its design. These limitations within the current state of the art are founded on a series of technologies in the art beginning with George Richards' U.S. Pat. No. 2,835,229 in 1958.

The first embodiment of Richard's flow meter invention is the version built around a cylindrical blocking rotor with two recesses as show in FIGS. 1 through 10 of the 1958 patent. This version has been the model for most, if not all, of the flowmeters built since then within this type of flowmeter design. The design of the blocking rotor with two recesses used by Richards significantly obstructs the inlet and outlet ports, as evidenced by later patents, including Siebold's 1969 U.S. Pat. No. 3,457,835, Blomgren's 1969 U.S. Pat. No. 3,465,683 and Kolb's 1978 U.S. Pat. No. 4,109,525.

Additional attempts were made to try to remedy the problem of the blocking rotor. Kolb's 1996 U.S. Pat. No. 5,513,529 improves the design of the flowmeter by redirecting the inlet and outlet ports toward the displacement rotors and less toward the blocking rotors than in prior designs, but the historical trefoil configuration of the rotors still positions the blocking rotor to partially block the flow through the inlet and outlet, as seen in FIG. 1 of the Kolb 1996 patent.

Kolb's 1998 U.S. Pat. No. 5,808,196, made further modifications to the inlet and outlet ports, as well as an extension of the upper housing further down to shield the blocking rotor from direct inlet and outlet flow and to reduce vibrations. However, large turns in the flow path are still inherently required by the position of the blocking rotor relative to the inlet and outlet. Instead of the blocking rotor obstructing the flow path, that portion of the housing which shields the top of the blocking rotor now directly obstructs the inlet and outlet.

The Kolb 1998 patent also features a displacement rotor blade which during part of its rotation cycle, extends across the adjacent blocking rotor cavity almost to contact the central wall dividing the two blocking rotor cavities. In its rotation the displacement rotor blade must forcefully intrude, displacing and sweeping through the volume of fluid within the blocking rotor cavity. This action generates turbulence, uses increased energy and contributes to the pressure drop and to cyclical pressure drop fluctuations responsible for some of the remaining vibration in flow meters currently available in this design.

While attempts have been made to remedy the problem associated with the impact of the flow path and flow rate by the structure and components of the flowmeter, the use of a single cavity blocking rotor has not been used in the art. In Richards' 1958 patent, Richards uses a variety of algebraic formulas to describe the numerical relationships between the integral and geometric parameters shaping the elements in the various forms of his invention. These equations describe the angles between rotor axes and the angular extent of various arcuate surfaces all ultimately as function of two integral variables, B and D, where B is the number of recesses in the blocking rotor and D is the number of displacement rotors. Notably, Richards, as well as Kolb, all feature blocking rotors only with two or more recesses (B>=2). No one in the prior art has developed a single cavity blocking rotor (B=1) due to the fact that the prior art teaches away from a single cavity blocking rotor because the algebraic and geometric principles upon which the Richards and Kolb flowmeters were designed and configured preclude the very use of a single cavity blocking rotor.

In order to create a flowmeter with a single cavity blocking rotor, the long standing principles and formulas of Richards had to be contradicted for a new formula that incorporates structural changes to both the blocking rotor and the displacement rotors to permit a single cavity blocking rotor. The simpler and more efficient blocking rotor in the preferred embodiment is not possible applying Richards' principles and formulas.

In particular, Richards' principle (6) in his 1958 patent text column 9, lines 34-39 requires "the angular extent ($\beta$) of each sealing surface of the blocking rotor be equal to 360 degrees divided by the product of the number of recesses in the blocking rotor (B) and the number of displacement rotors (D)." Richards, and subsequent flowmeters modeled using his equations and principles, set (B) equal to or greater than 2. A double recess blocking rotor would require the angular extent ($\beta$) of the sealing surface on the blocking rotor to equal 360 degrees divided by 4, or 90 degrees. About 90 degrees is the largest blocking rotor sealing surface angular extent seen in the prior art.

Unlike any of Richards' embodiments' or any related prior art, the preferred embodiment of this new invention exhibits only one recess in the blocking rotor (B=1). Taking the single cavity blocking rotor (B=1) and two displacement rotors (D=2) and applying Richard's equations results in an angular extent ($\beta$) of the sealing surface on the blocking rotor to equal 360 degrees divided by 2, or 180 degrees, and the angular extent of the blocking rotor recess to also equal 180 degrees. Since these two angular components entirely describe the blocking rotor's circular cross-section, such a blocking rotor would render the flowmeter useless since it would fail to provide a continual sealing surface between the blocking rotor, the displacement rotors and the interior surface of the chamber, or else physically interfere with the displacement rotor blades.

In the preferred embodiment, the angular extent of the blocking rotor sealing surface is around 300 degrees with one recess, an embodiment that is not possible with Richards' principle (6). This new approach to flowmeter technology permits a unique blocking rotor and casing design that are far outside the parameters allowed by Richards' formula. Only by contradicting the longstanding principles and equations of Richards and the subsequent developed technology based upon his science is the single cavity blocking rotor possible.

Next, Richard's principle (8) (in his 1958 patent text column 9, lines 49-52) requires the angular extent ($\phi$) of the surface on the casing making sealing contact with the blocking rotor to be $>=\Delta$, in this case $>=180$ degrees. However, Principle (5) (in his 1958 patent text column 9, lines 34-40) requires the angle between the axes of the two displacement rotors to equal 360 degrees divided by the number of recesses (B) in the blocking rotor less the angular extent ($\beta$) of the sealing surface of the blocking rotor, or 360/1−180 degrees=180 degrees. Thus for this design configuration, Richards' principle (5) also places the axes of the two displacement rotors 180 degrees apart, requiring the displacement rotor hubs to meet the blocking rotor in exactly the same physical space in which the sealing surface of the casing also would meet the blocking rotor.

This would necessarily locate the physical material of the casing simultaneously in the same volume of space where the sealing surfaces of at least one displacement rotor hub must meet the sealing surface of the blocking rotor, a physical impossibility, which if it were somehow made possible—say with a casing of nearly zero thickness—would still fatally interfere with full rotation of the displacement rotor blades.

Under Richard's equations, designs with a single cavity blocking rotor and more than two displacement rotors (B=1 and D>2) fail for the same reason. Richards' equations result in unworkable interference between the casing and one or more of the displacement rotors in all such cases.

In the preferred embodiment the angle between the axes of the two displacement rotors is 180 degrees. However, choosing parameters far outside the bounds of Richards' principle (6) in the preferred embodiment, the angular extent of the blocking rotor sealing surfaces is about 300 degrees, much greater than the prescribed 180 degrees. This shrinks the angular extent of the blocking rotor recess down from 180 degrees to about 60 degrees instead. Correspondingly, the angular extent of the casing surface which seals with the blocking rotor then is also shrunk down to about 60 degrees, positioning said casing well outside of each displacement rotor blade's path of rotation.

FIGS. 6, 7, 8, and 9 show a range of designs where the angular extent of the blocking rotor sealing surfaces ranges between 210 and 300 degrees, illustrating alternative embodiments of this invention. These ranges are not to be construed as limiting. Angular value parameter choices anywhere within this continuous range, and somewhat beyond it at either end, are feasible under the new principles. This is unlike Richards' claims which specifically limit this angle to 360 degree/BD, where B and D must be small integers, i.e., B=the number of recesses in the blocking rotor and D=the number of displacement rotors.

Another key difference between more recent prior art blocking rotors and the preferred embodiment is that instead of Kolb's (1998 patent) circular end walls recessed into circular depressions machined into the housing end plates, the preferred blocking rotor end walls are circular minus just enough of a cutout to allow for cooperation between the rotation of the displacement rotor blades and the blocking rotor end wall without necessarily recessing the blocking rotor end wall into impressions in the end plate, simplifying their manufacture.

End wall to end wall, Kolb's blocking rotor is axially longer than his displacement rotors, while the preferred blocking rotors are the same length as the preferred displacement rotors. Circular end walls with a small cutout maintain most of the extra strength and rigidity provided by Kolb's light weight blocking rotor with end walls, while also allowing simpler flat end plates, i.e., no need to machine circular recessions/depressions for the blocking rotor, thus allowing each end plate to be simpler to manufacture by virtue of its working surface being flat in a single plane. The preferred embodiment still allows recessing the blocking rotor into the housing end plate if desired for other reasons.

Prior art used a 90 degree angle between the three rotor axes, necessarily positioning the blocking rotor so as to define and require a flow path in which the blocking rotor and/or the blocking rotor sealing surface of the casing is necessarily located where it must force sharp turns in the flow path at both the inlet and outlet and also directly obstructing flow and forcing a sharp turn below the blocking rotor, between the two displacement chambers, contributing to the pressure drop.

It is therefore desirable to have a flowmeter with a flow path that can accommodate an increased flow rate but has decreased pressure drop, cyclical pressure drop fluctuation and vibration.

It is further desirable to have a flowmeter that can maintain accuracy despite increased flow rates due to a smoother and more fluid flow path through the meter.

It is further desirable to have a flowmeter with a compact housing with in-line inlet and outlet ports for universal replacement of other compact in-line flowmeters of competing and less accurate varieties.

It is further desirable to have a flowmeter with easy in-line replacement installation in tight locations where flowmeters needing the added length of custom runners would be ruled out.

It is further desirable to have a flowmeter with high maximum flow rates exceeding similarly sized prior models.

It is further desirable to have a flowmeter with accuracy over a range of flow rates exceeding the current state of the art for positive displacement flowmeters.

SUMMARY OF THE INVENTION

This invention resides in an improvement of a rotary positive displacement flowmeter device of the type having a housing within which a pair of displacement rotors are rotatably mounted within a fluid chamber, and a blocking rotor positioned between the displacement rotors.

The invention resides in the use of a cross over inlet and outlet configuration, which may be bifurcated at the inlet or outlet, to allow a smoother flow path with less angles and turns to decrease the turbulence, vibration and pressure drop within the system.

The structure of the cross-over feature diminishes the need for custom runners in many cases and allows application of this flowmeter to existing installations where other flowmeters would not fit. The cross-over feature also permits a smoother flow into the flowmeter chamber compared to currently existing designs where the flow must abruptly turn 90 degrees or more into the flowmeter, resulting in greater turbulence, pressure drop and vibration.

The invention resides in an additionally improved blocking rotor having a single opening, cavity or recess, applicable to both cylindrically solid and hollow rotor embodiments. Having one recess instead of 2 or more allows the blocking rotor to be located more directly between the displacement rotors, reducing its obstruction of both the inlet and outlet chambers, as well as decrease the overall area of blocking rotor surfaces confronting and opposing fluid flow during the blocking rotor's cyclical rotation improving the consistency of the flow rate through the flowmeter resulting in decreased pressure drop, turbulence and vibrations.

The blocking rotor, in the preferred embodiment, is a hollow chamber which can be rotated with much less work than any blocking rotor in the prior art, also generating less turbulence.

For the most accurate measurement of fluid transfer, ideally the meter casing would be completely filled with fluid at all times, including the volume inside the preferred hollow cylindrical blocking rotor. Unlike prior art blocking rotors, the single cavity requires no bisecting web surface and therefore does not waste energy rotating fluid inside the rotor. This greatly reduces flow resistance, rotational inertia, and energy wasting turbulence inside and around the blocking rotor. Energy loss due to rotation of the single cavity blocking rotor is a fraction of that loss for two or more cavity prior art blocking rotors. This means a lower pressure drop across the device and a more linear measurement response at lower flow rates than is possible for blocking rotors with more than one recess separated by webbed surfaces. Lower pressure drop means a smaller flow meter might be made to serve the given application, or a smaller pump and less energy used to drive it.

The single cavity blocking rotor also allows the more efficient 180 degrees straight-line design configuration of the three rotors which is not allowed by the two cavity blocking rotor in Richards' preferred trefoil shaped embodiment. Prior art trefoil configurations inefficiently direct the flow toward the blocking rotor and/or the blocking rotor sealing surface of the casing forcing sharp turns in flow at the inlet and at the outlet. They also direct flow toward the blocking rotor forcing another turn below the blocking rotor between the two displacement chambers. All of these turns create turbulence, waste energy, and contribute to pressure drop across prior art devices. The degree of blocking rotor obstruction at each of these turns varies cyclically with its rotation, thereby contributing to increasing vibration at higher flow rates.

The straight-line arrangement of the rotors more efficiently directs the flow path around the blocking rotor, not toward it. Much lower energy cost, lower pressure drop, and less vibration is generated by this invention because the straight line rotor axes configuration does not direct flow toward the blocking rotor at the inlet, nor at the outlet, nor between the displacement chambers. This more efficient flow path with fewer obstructions and fewer sharp turns may allow smaller devices to be constructed with the same flow capacity of larger prior art devices. That combined with its simplicity of design suggest this invention may offer significant cost advantages over comparable devices in a wide range of installations.

The invention resides in displacement rotors with a more prominent hub compared to any available in the art, with a radius large enough to route the flow completely around the blocking rotor, reducing its interference with the flow. Displacement rotor hubs performing this function are not found in prior art. The displacement rotor hub, in the preferred embodiment, defines a hollow chamber bisected by the displacement rotor blade. Unlike prior are, the preferred displacement rotor hub radius is about equal to the blocking rotor radius, allowing the displacement rotor hub surface and the blocking rotor surface to roll against each other with equal velocities, reducing fluid shear and slippage between the rotors for improved accuracy. The displacement rotor blade extends beyond the hub circumference to the extent necessary to create a sealing means with both the blocking rotor recess and the interior wall of the housing, more particularly, the fluid chamber.

The invention resides in the configuration of the inlet and outlet chambers, the fluid chamber, the blocking rotor and the displacement rotors, in creating a flow path that is smoother, straighter and less turbulent flow path, than is previously known in the art which results in greater accuracy at higher flow rates, as well as to increase the longevity of the meter at increased flow rates.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of the invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 1A is a cross section of an embodiment of a positive displacement flowmeter.

FIG. 1B is a cross section of an embodiment of a positive displacement flowmeter.

FIG. 1C is a cross section of an embodiment of a positive displacement flowmeter.

FIG. 1D is a cross section of an embodiment of a positive displacement flowmeter.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
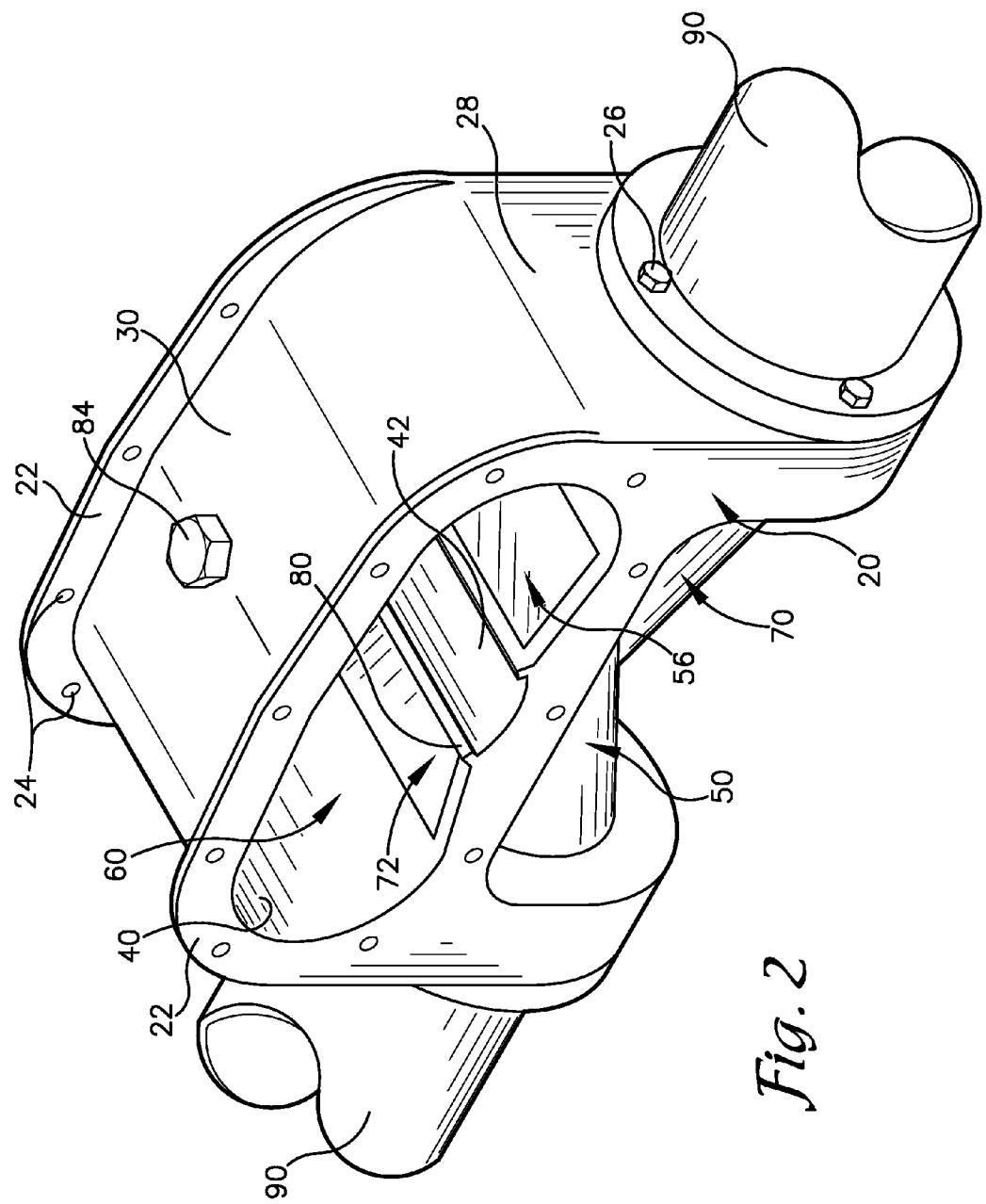
FIG. 2 is a bottom and side view of an embodiment of a positive displacement flowmeter housing.

First referring to FIGS. 1A and 2, a flowmeter 10 according to one embodiment as shown. The flowmeter 10 comprising a housing or casing 20, an inlet 50, a fluid chamber 60, and an outlet 70. The housing 20 is comprised of an end wall 22, a plurality of hole 24, bolt(s) 26, a side wall 28, a bottom wall 30, a side wall 32, a top wall 34, a side interior surface 36, a bottom interior surface 38, a side interior surface 40, and a top interior surface 42.

The inlet 50 is comprised of an inlet opening 52, an inlet channel 54, an interior surface 55, and an inlet port 56.

The fluid chamber 60 is comprised of an inlet displacement chamber 62, a central chamber 64, and an outlet displacement chamber 66.

The outlet 70 is comprised of an outlet port 72, an outlet channel 74, an interior surface 75, and an outlet opening 76.

The flowmeter 10 attaches to an existing line by connecting the attachment 90 from the existing line to the inlet opening surface 51 of the housing 20. The surface 91 of the attachment 90 connect with the inlet opening surface 51 of the housing 20. A sealing means 92 may be located between the attachment 90 and the housing 20. The attachment 90 is secured to the inlet opening surface 51 of the housing 20 by a plurality of bolts 26 extending through voids in the attachment 90 that line up with voids in the inlet opening surface 51 of the housing 20. The voids in the inlet opening surface 51 of the housing 20 have a plurality of threads that align with the bolts 26.

The same procedure is applicable for connecting an attachment 90 to the outlet opening surface 77 of the housing 20.

Once the flowmeter 10 is connected to the attachments 90 at both the inlet opening surface 51 and the outlet opening surface 77, the substance, typically gas or liquid, can flow through the closed system. The substance will flow from the attachment 90 through the inlet opening 52 into the inlet channel 54. The inlet channel 54 has an interior surface 55 that define the limits of the path of the substance through the inlet 50. The substance then goes from the inlet channel 54 through the inlet port 56 into the fluid chamber 60.

The fluid chamber 60 is divided into three continuous chambers, namely, the inlet displacement chamber 62, the central chamber 64 and the outlet displacement chamber 66, which correspond to the inlet and outlet displacement rotors 300 and the blocking rotor 200. The meter 100 (Refer to FIG. 3) component of the flowmeter 10 is mounted into the fluid chamber 60, and will be described in detail later. As the substance enters the inlet displacement chamber 62 of the fluid chamber 60 from the inlet channel 54, the substance flows from the inlet displacement chamber 62 rotating the inlet displacement rotor 300 through the central chamber 64 where the blocking rotor 300 rotates and into the outlet displacement chamber 66 containing the outlet displacement rotor 300. From the outlet displacement chamber 66 the substance enters that outlet channel 74 of the outlet 70 through the outlet port 72.

After entering the outlet channel 74 through the outlet port 72, the substance continues through the outlet channel 74 until it reaches the outlet opening 76. The outlet channel 74 has an interior surface 75 that defines the limits of the flow path through the outlet 70. The substance then moves through the outlet opening 76 and into the attachment 90 connected to the outlet opening surface 77 of the outlet 70.

While described herein the substance moving in one direction through the flowmeter, the meter movement and flow direction are fully reversible without compromising the integrity of the flowmeter or the accuracy of the volume measurement.

The attachments 90 from the existing lines are generally cylindrical in shape. For purposes a fluid connection, the inlet opening 52 and the outlet opening 76 are cylindrical in shape, but may take any shape consistent with applications known in the art. However, the inlet port 56 and the outlet port 72 are, in general, elongated with a rectangular or oval shape. Therefore, the inlet channel 54 and the outlet channel 74 have a different cross sectional shape as the substance moves from both the inlet opening 52 to the inlet port 56 and from the outlet port 72 to the outlet opening 76.

The top interior surface 42 of the fluid chamber 60 of the housing 20 contains two sealing surfaces 80. The sealing surfaces 80 are angled to provide for contact with the exterior surface 231 of the blocking rotor 200, described later.

Located in the bottom wall 30 of the housing 20 of the flowmeter 10 is a void 82 extending from the exterior surface 44 of the housing 20 to the bottom interior surface 38 of the housing 20. The void 82 has a plurality of threads. A drain plug 84 is inserted into the void 82 from the exterior of the housing 20. The drain plug 84 is then screwed in conjunction with the plurality of threads to provide a seal that can be removed such that the interior of the flowmeter 10 can be drained by removing the drain plug 84.

Having described the preferred embodiment of the housing 20, the preferred embodiment of the meter 100 is described with reference to FIG. 3. The meter 100 comprising a rear cap cover 102, a rear plate 110, a blocking rotor 200, two displacement rotors 300, a gear housing 120, displacement gear rotors 140, displacement gear rotor washers 142, a blocking gear rotor 150, a blocking gear rotor driver 152, compression or spring washer 160, bolts 162, a front cover cap 170 and bolts 180.

Figure 4:
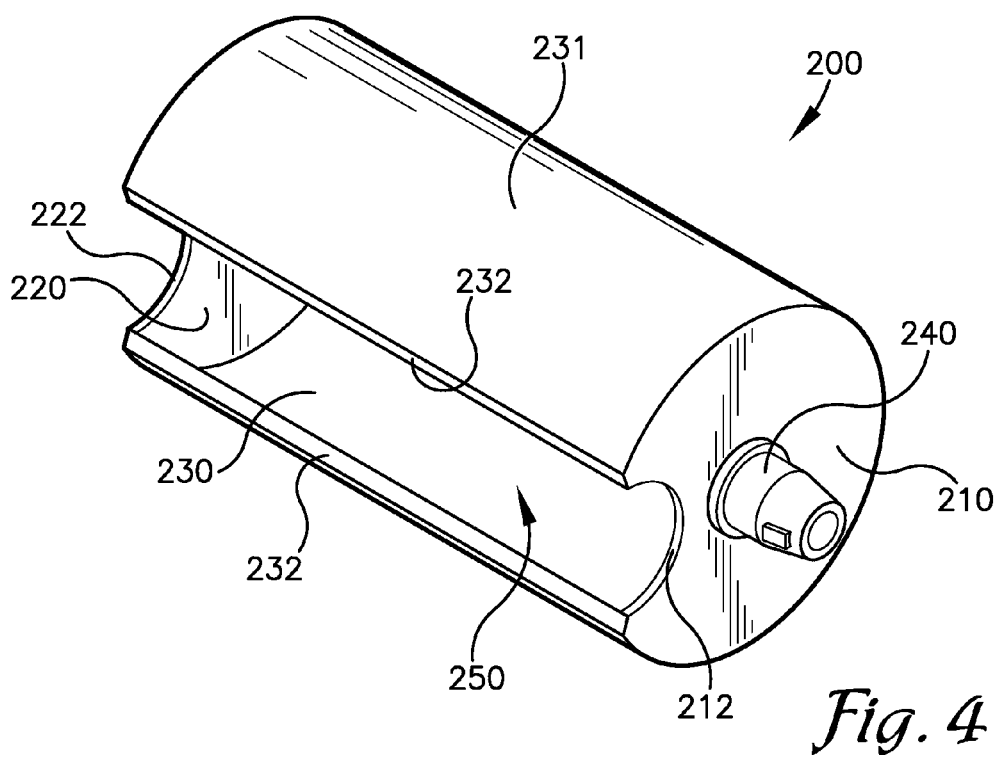
FIG. 4 is an angled view of a blocking rotor.
Figure 12:
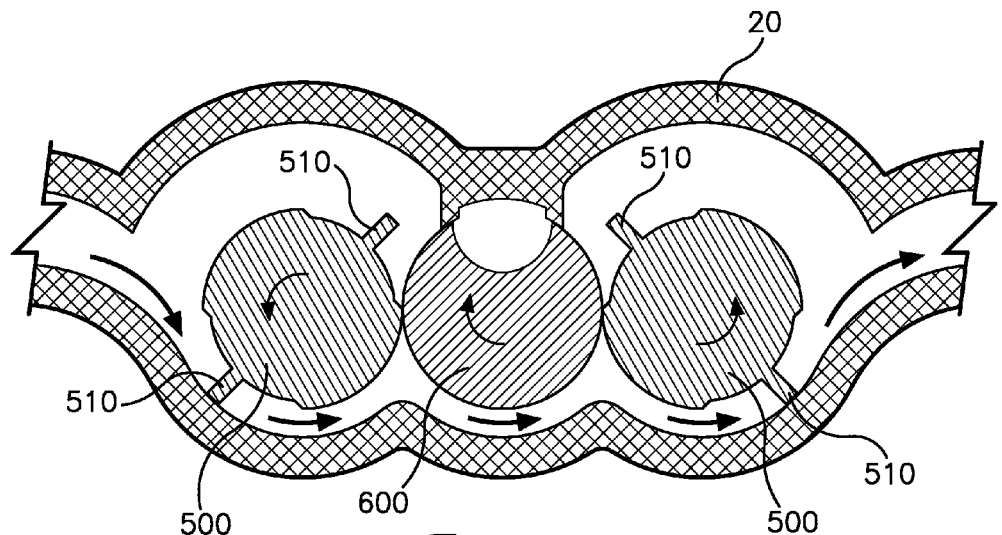
FIG. 12 is a cross section of an embodiment of a positive displacement flowmeter showing solid, double bladed displacement rotors and an alternative housing.
Figure 13:
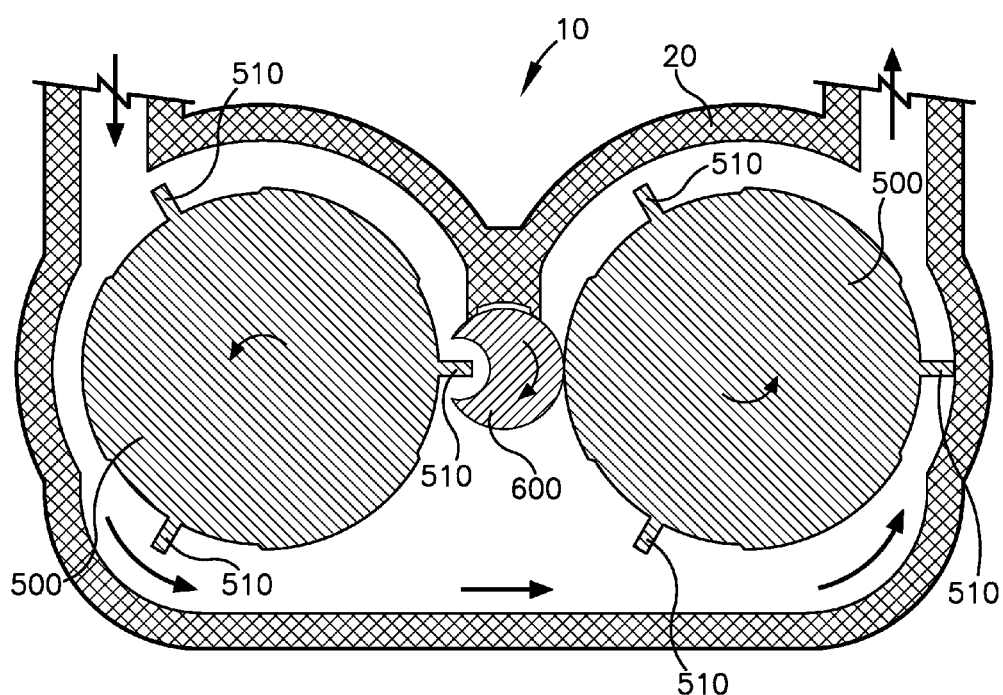
FIG. 13 is a cross section of an embodiment of a positive displacement flowmeter showing solid, triple bladed displacement rotors and an alternative housing.

Referring to FIG. 4., a blocking rotor 200 as shown comprising a front end wall 210, a rear end wall 220, and an arcuate side wall 230. The front end wall 210 has an end wall void 212 and the rear end wall 220 has an end wall void 222. The sidewall 230 has an angled sidewall edge 232. There is a front journal 240 and a rear journal (not shown) that are well known in the art in meter applications such as a flowmeter. The interior of the blocking rotor 200 in the preferred embodiment as shown is a hollow cavity 250. While the blocking rotor 200 can be solid in certain applications, such as in pumps, as shown in FIGS. 12 and 13, 600, the preferred embodiment is a hollow cylinder 250.

Figure 5:
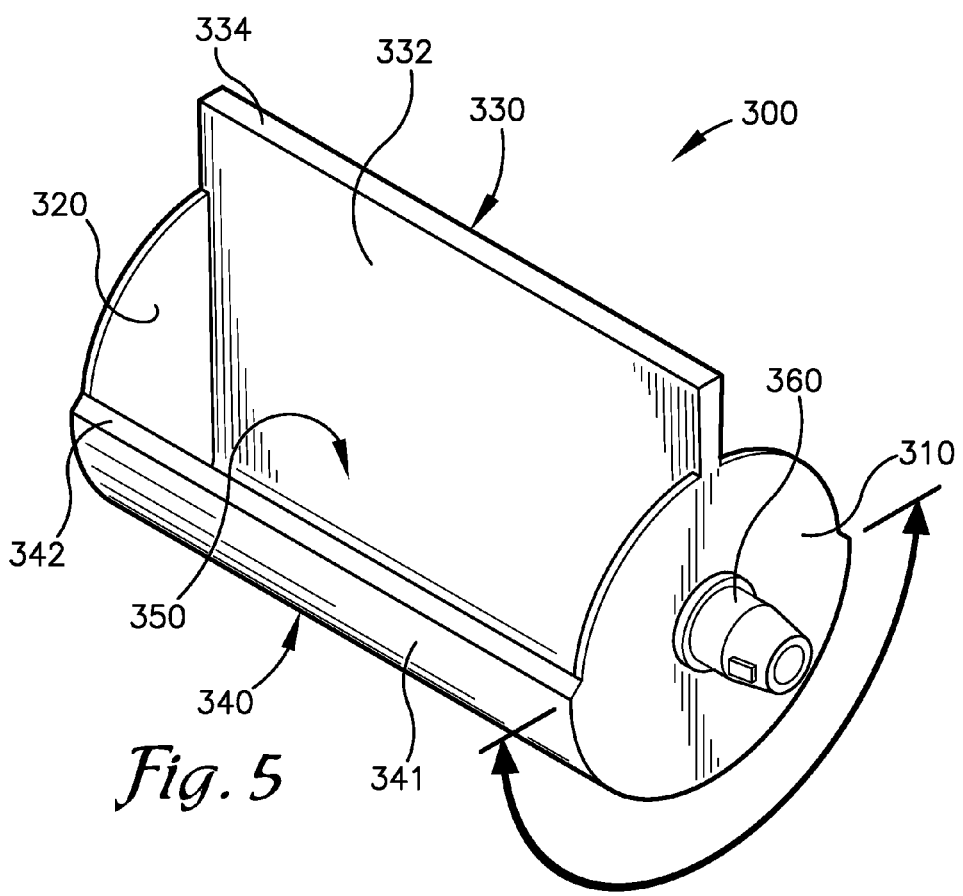
FIG. 5 is an angled view of a displacement rotor.

Referring to FIG. 5, a displacement rotor 300 as shown comprising a front end wall 310, a rear end wall 320, an arcuate side wall 340 and a displacement blade 330. The arcuate side wall 340 has an angled sidewall edge 342 and an exterior surface 341. The displacement blade 330 has a displacement surface 332, a back surface (not shown), and a sealing surface 334. There is a front journal 360 and a rear journal (not shown) that are well known in the art in meter applications such as a flowmeter. The interior of the displacement rotor 300 in the preferred embodiment as shown is a hollow cylinder 350. While the displacement rotor 300 can be solid in certain applications, such as in pumps, as shown in FIGS. 12 and 13, 500, the preferred embodiment is a hollow cavity 350.

In the preferred embodiment, the cylindrical size, that is, the radius, diameter and circumference of the cylinder, is the same in both the blocking rotor 200 and the displacement rotors 300. Modifications to the size of the cylinders may be necessary based upon specific applications, however, the novel similarity between the size of the cylinders are important in creating the uniform flowpath unseen in the prior art.

Figure 3:
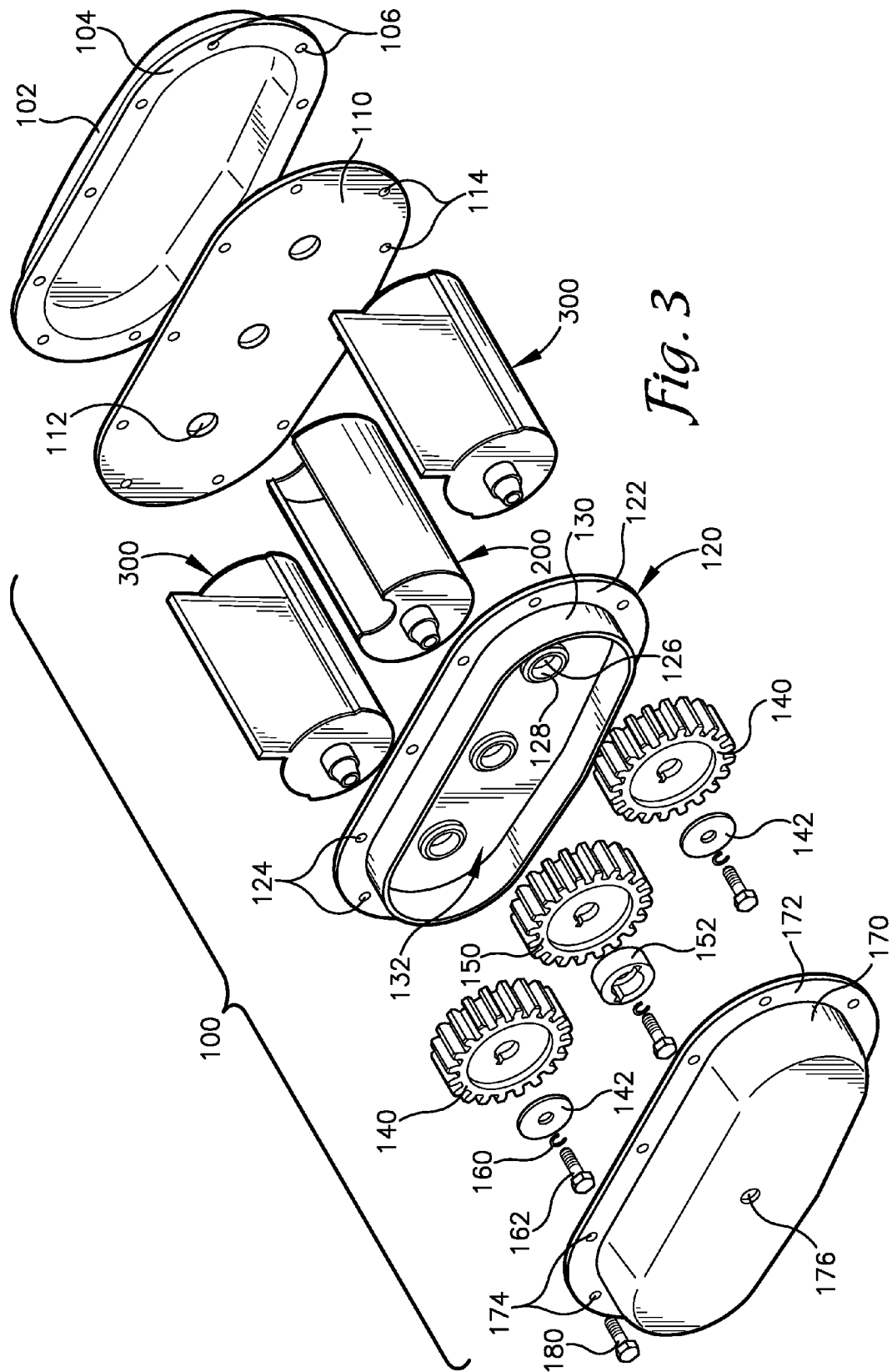
FIG. 3 is an exploded view of a meter.

The meter 100 is assembled as shown in FIG. 3. The blocking rotor 200 and the displacement rotors 300 are inserted into the fluid chamber 60 of the housing 20 of the flowmeter 10. The displacement rotors 300 occupy the space within the fluid chamber 60 designated at the inlet displacement chamber 62 and the outlet displacement chamber 66. The displacement rotor 300 within the inlet displacement chamber 62 may be referred to as the inlet displacement rotor. The displacement rotor 300 within the outlet displacement chamber 66 may be referred to as the outlet displacement rotor. The blocking rotor 200 occupies the space within the fluid chamber 60 designated as the central chamber 64.

The rear plate 110 contains voids 112 that align with the rear journals (not shown) for both the blocking rotor and the two displacement rotors. The rear journals are inserted through the voids 112 of the rear plate 110. The rear plate 110 has a plurality of holes 114 that align with the plurality of holes 24 in the end wall 22 of the housing 20 of the flowmeter 10.

The rear cover cap 102 has a lip 104 that contains a plurality of holes 106. The holes 106 align with the holes in the rear plate 110 and the holes in the end wall 22 of the housing 20. The rear plate 110 and the rear cover cap 102 are attached to the housing 20 by bolts (not shown) that are inserted through the plurality of holes 106 of the rear cover cap 102, through the plurality of holes 114 of the rear plate 110, then through the plurality of holes 24 in the end wall 22 of the housing, where the end of the bolt is then secured with a nut or some other securing device known in the art.

With the rear journals (not shown) resting within the voids 112 of the rear plate 110, the front journal 240 of the blocking rotor 200 and the front journals 360 of the displacement rotors 300 rest within the voids 126 of the plate 122 of the gear housing 120. The interior wall 128 of the voids 126 in the plate 122 of the gear housing 120 may contain ball bearings or any other means known in the art for creating a near frictionless centrifical movement.

The gear housing 120 has a lip 130 extending from the plate 122 that creates a gear chamber 132. When the front journals 240, 360 are inserted through the voids 126 in the plate 126, a blocking gear rotor 150 is attached to the front journal 240 of the blocking rotor 200 and the displacement gear rotors 140 are attached to the front journals 360 of the displacement rotors 300. A driver 152 is placed adjacent to the blocking gear rotor 150 with the driver 152 and the blocking gear rotor 150 attached to the front journal 240 of the blocking rotor 200 by a bolt 162 and a compression or spring washer 160. The displacement gear rotors 140 are attached to the front journals 360 of the displacement rotors 300 by a washer 142, a compression or spring washer 160, and a bolt 162.

A front cover cap 170 has a lip 172 containing a plurality of holes 174. The plurality of holes 174 in the lip 172 of the front cover cap 170 align with the plurality of holes 124 in the plate 122 of the gear housing 120 and with the plurality of holes 24 in the end wall 22 of the housing 20. Bolts 180 are inserted through the plurality of holes 174 in the front cover cap 170, through the plurality of holes 124 in the gear housing 120 and through the plurality of holes 24 in the housing 20. The bolts 180 are then secured by nuts or other means of securing a bolt as known in the art, such as threading the holes 174, 124.

The front cover cap 170 has a drive shaft void 176 for purposes of inserting a drive shaft as known in the art.

Referring to FIGS. 1A, 1B, 1C and 1D, the flow path of the preferred embodiment is demonstrated visually as shown. In a working condition, a given substance, typically either a liquid or gas, will fill the housing 20, including the inlet and outlet channels 54, 74, the fluid chamber 60, the cavities 350 of the displacement rotors 300 and the cavity 250 of the blocking rotor 200.

FIG. 1A shows the displacement blades 330 in a vertical, 12 oclock position with the sealing surface 334 of the displacement blades 330 in contact with the top interior surface 42 of the housing 20. As further shown in FIGS. 1B, 1C and 1D, the displacement rotors 300 rotate in a direction opposite of the blocking rotor 200, as shown the displacement rotors 300 move in the counterclockwise direction.

As the substance moves through the fluid chamber 60, the substance is prevented from backflowing by seals created by the parts. The sealing surface 80 located on the top interior surface 42 of the housing 20 comes in contact with the exterior surface 231 of the blocking rotor 200 during the rotation of the blocking rotor 200, such that the substance is forced through the outlet port 72 and cannot reenter the inlet displacement chamber 62. The exterior surface 341 of the displacement rotors 300 and the exterior surface 231 of the blocking rotor 200 also create a seal by virtue of their close proximity to the other. These seals force the substance moving through the flowmeter to move in a fluid uniform fashion.

The flow path of this flowmeter 10 is demonstrated in FIGS. 1A, 1B, 1C and 1D. While the substance is generally moving through the flowmeter 10 continuously, this description focuses on a set point in the flow of the substance for purposes of demonstration. The substance enters the flowmeter 10 through an outside line, as previously described. The substance enters through the inlet opening 52, travels through the inlet channel 54, through the inlet port 56 and enters the inlet displacement chamber 62. The displacement rotors 300 and the blocking rotor 200, through their rotation, create the flowpath by which the substance moves through the flowmeter 10. As the substance pushes the displacement rotor blade 330 through the counterclockwise motion, the blocking rotor 200 and the other displacement rotor 300, likewise rotate. The pressure for moving the substance remains with the displacement rotor 300 in the inlet displacement chamber 62 until FIGS. 1C and 1D, when the displacement rotor 300 in the outlet displacement chamber 66 creates the seal and the pressure from the substance forces the outlet displacement chamber 66 displacement rotor 300 to rotate until back in the position of FIG. 1A. The substance, given the rotation of the displacement rotors 300 and the blocking rotor 200, moves through the inlet displacement chamber 62, through the central chamber 64 and through the outlet displacement chamber 66. The substance then moves through the outlet port 72, through the outlet channel 74 and exists the flowmeter 10 through the outlet opening 76.

The structural similarity of the blocking rotor 200 and the displacement rotors 300 cylinders, in conjunction with the 180 degree axes alignment of the blocking rotor 200 and the displacement rotors 300 in the preferred embodiment, create the unique uniform flowpath by virtue of a similar distance between the exterior surface 231 of the blocking rotor 200 and the bottom interior surface 38 of the housing 20 and the exterior surface 341 of the displacement rotors 300 and the side interior surfaces 36, 40 of the housing 20. This flowpath decreases pressure drop, fluctuation and vibration by virtue of the uniform parts.

While the preferred embodiment of the flowmeter has a 180 degree line between the axis of the blocking rotor 200 and the axes of the displacement rotors 300, alternative embodiments permit the use of the single cavity blocking rotor 20 utilizing a larger hub and shorter blade protrusion of the preferred displacement rotors 300. (Refer to FIGS. 12 and 13).

Figure 6:
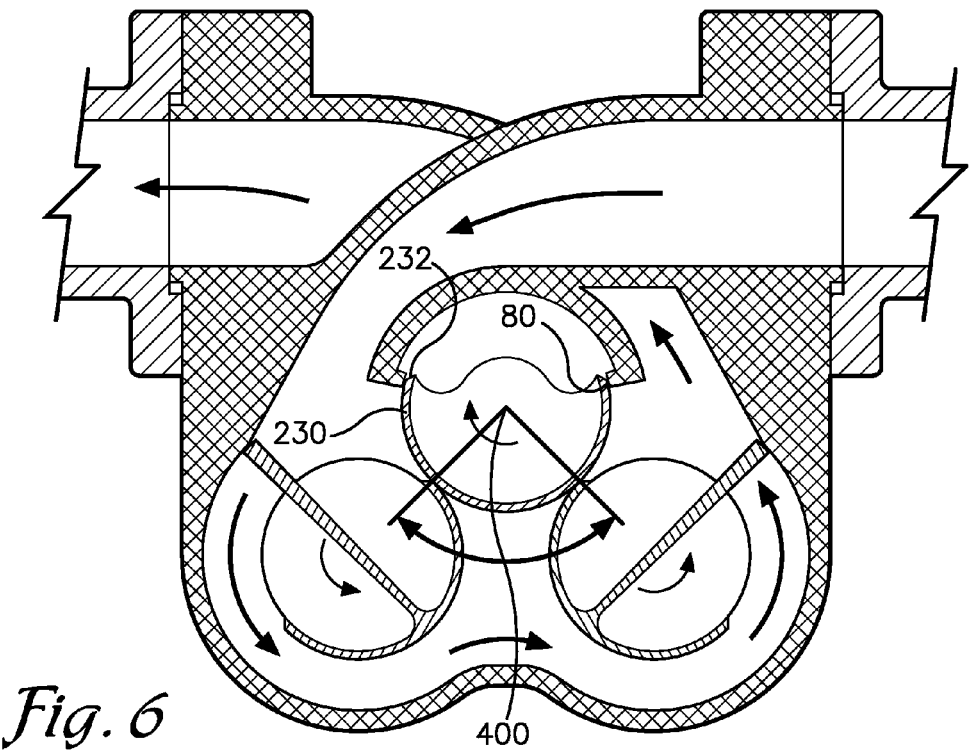
FIG. 6 is a cross section of an embodiment of a positive displacement flowmeter showing alternative angular relation between the axes of the displacement rotors and the axis of the blocking rotor.
Figure 7:
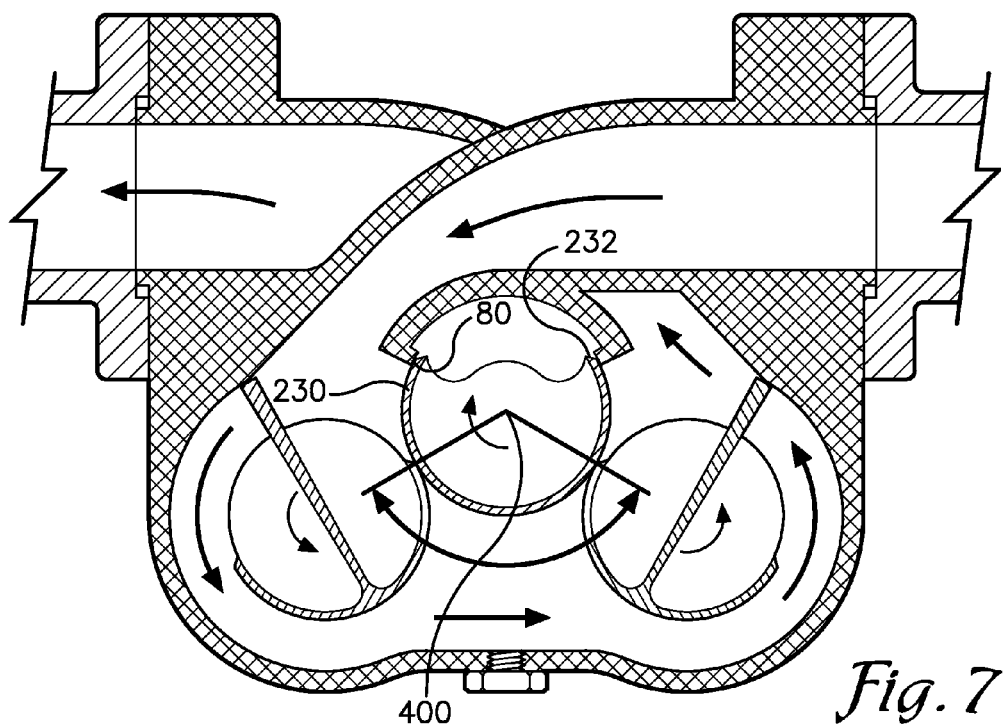
FIG. 7 is a cross section of an embodiment of a positive displacement flowmeter showing alternative angular relation between the axes of the displacement rotors and the axis of the blocking rotor.
Figure 8:
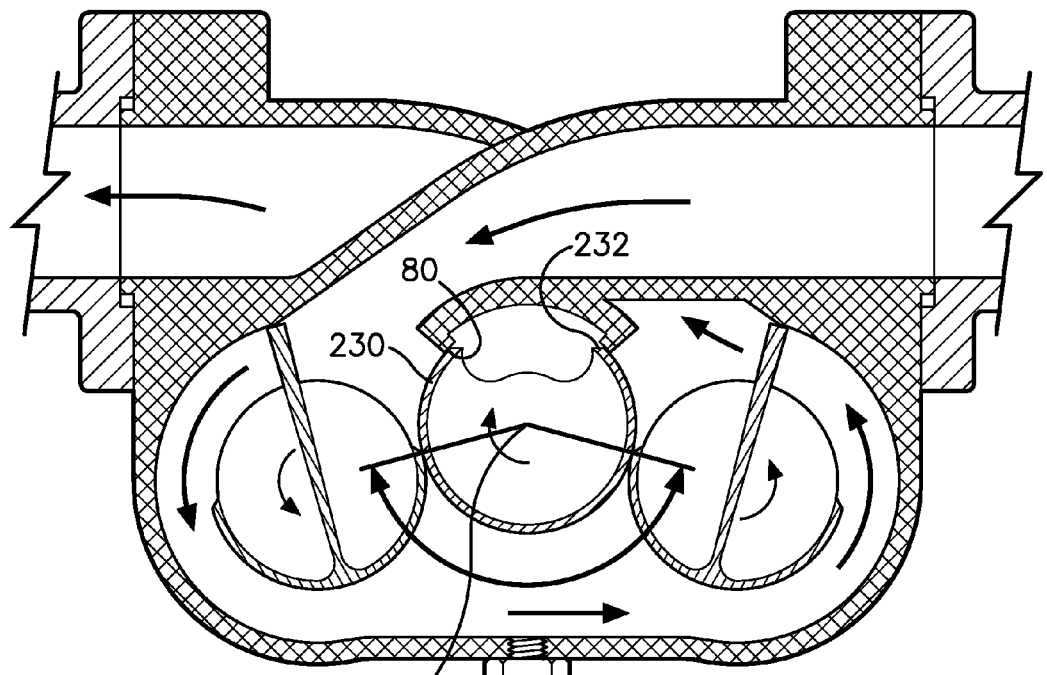
FIG. 8 is a cross section of an embodiment of a positive displacement flowmeter showing alternative angular relation between the axes of the displacement rotors and the axis of the blocking rotor.

Referring to FIGS. 6, 7 and 8, the angular relation between the rotational axes of the displacement rotors and the axis of the blocking rotor 400 is shown. The change in the angular relation 400 is possible by changing the position of the sealing surface 80 in relation to increases and decreases in the size of the endwall voids 212, 222 that correlate to changes to the exterior surface 231 parameters. Changes to the housing 20 would correspond as shown to the particular angular relationship 400 implemented in the flowmeter 10. The unique structure of the displacement rotors 300, in conjunction with the single recess blocking rotor 200, allows deviation from the 180 degree preferred embodiment axial alignment without the interference and/or obstruction of the flowpath by the parts.

Figure 9:
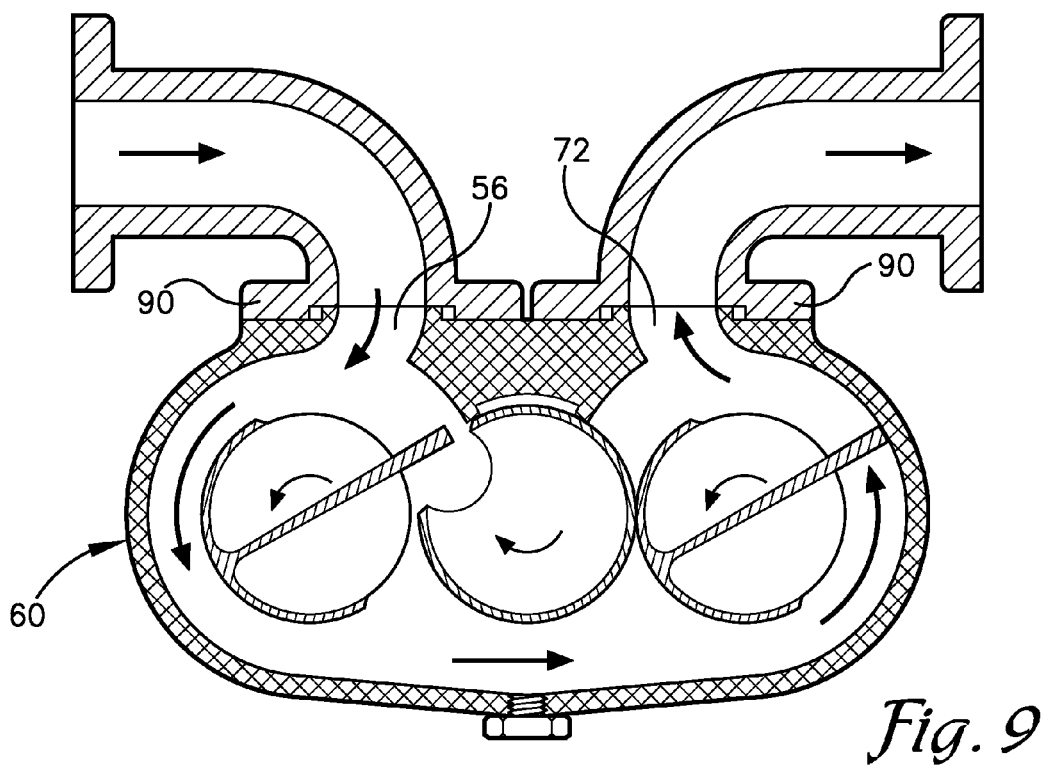
FIG. 9 is a cross section of an embodiment of a positive displacement flowmeter with an alternative housing structure for the attachment.

Referring to FIG. 9, another embodiment of this flowmeter 10 provides for the attachment 90 connecting directly to the fluid chamber 60 via an inlet port 56 without the inlet and outlet channels 74, 54 as seen in the preferred embodiment above. This alternative embodiment allows the application of the preferred embodiments displacement rotors 300 and the single cavity blocking rotor 200, as well as the preferred configuration of the apparatus to create the flow path as shown in FIGS. 1A, 1B, 1C, and 1D, into the alternative embodiment that is useful for certain applications where the preferred embodiment cannot be attached to the industrial application. Changes to the housing 20 structure may be required depending on the desired attachment site of the existing line.

Figure 10:
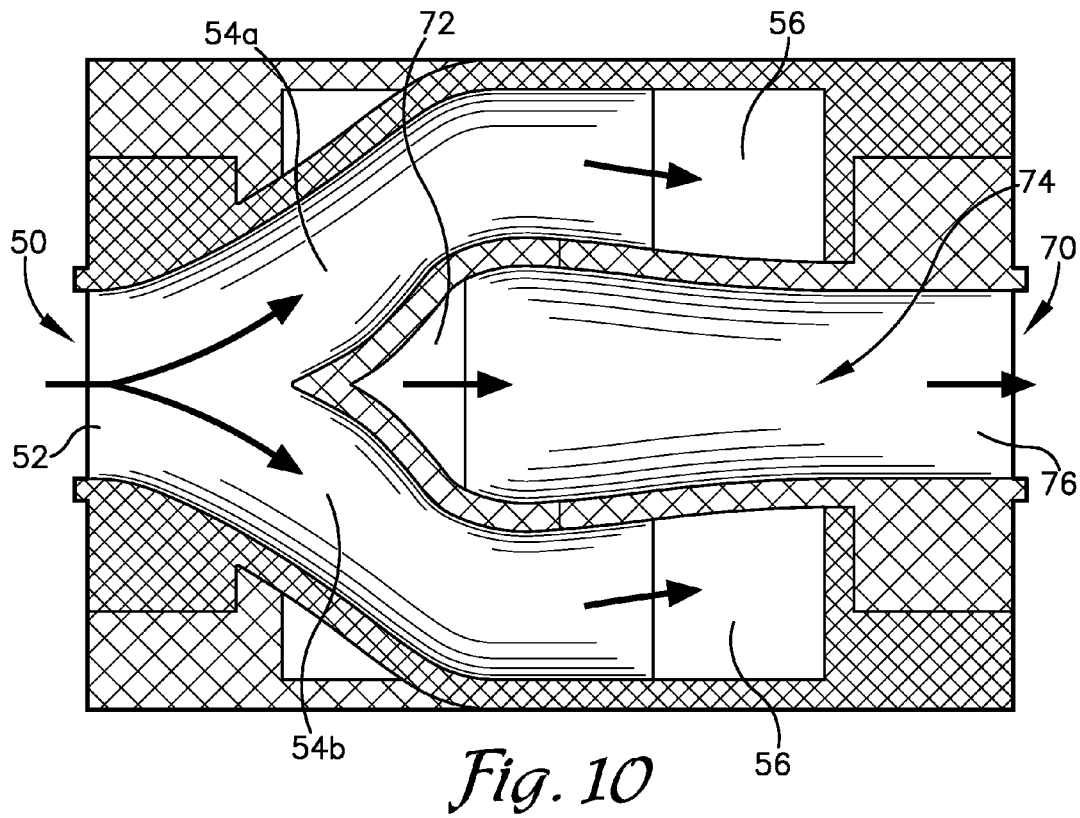
FIG. 10 is a top, cross section of an embodiment of a positive displacement flowmeter demonstrating a bifurcated inlet chamber.
Figure 11:
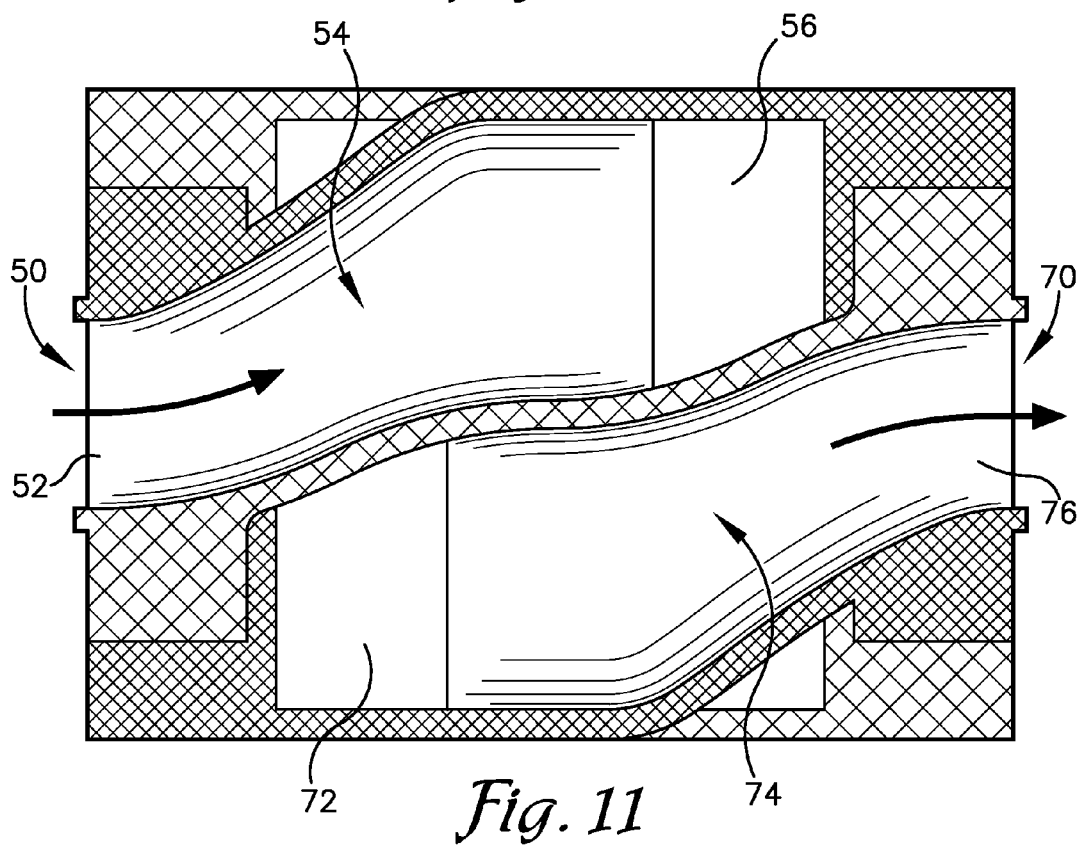
FIG. 11 is a top, cross section of an embodiment of a positive displacement flowmeter showing a cross over inlet and outlet chamber.

Referring to FIGS. 10 and 11, FIG. 11 shows the preferred embodiment cross-over inlet 50 and outlet 70. An alternative embodiment, as shown in FIG. 10, shows an inlet 50 with a bifurcated inlet chamber 54a, 54b. The alternative embodiment allows for two flow channels into the inlet displacement chamber 62 while the preferred embodiment has one solitary flow channel.

Referring to FIGS. 12 and 13, alternative embodiments are shown with solid blocking rotors 600 and solid displacement rotors 500. FIG. 12 shows an alternative embodiment with displacement rotors 500 with two blades 510. FIG. 13 shows an alternative embodiment with displacement rotors 500 with three blades 510. The alternative embodiments in FIGS. 12 and 13 allow for the single cavity blocking rotor 600 as described in the preferred embodiment 200. Changes to the blocking rotor 600 in FIGS. 12 and 13 include removal of the angled sidewall edge 232 as seen in the preferred embodiment. Other alternatives as shown include modifications as needed to the housing 20 of the flowmeter 10.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive flowmeter for measuring the flow of substances is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A rotary positive displacement flowmeter comprising:
    a housing having an inlet, an outlet and a fluid chamber, said fluid chamber imposed between said inlet and said outlet;
    a meter mounted in said fluid chamber, said meter comprising an inlet displacement rotor having a blade extending therefrom, an outlet displacement rotor having a blade extending therefrom, and
    a blocking rotor imposed between said displacement rotors, said blocking rotor having a single opening for receiving said blades therein.

2. The flowmeter as claimed in claim 1, wherein the longitudinal axes of said rotors are substantially aligned in a single plane.

3. The flowmeter as claimed in claim 1, wherein the angular relation between the axes of said rotors is between 91 degrees and 180 degrees.

4. The flowmeter as claimed in claim 1, wherein said blocking rotor is a hollow cylinder, the sidewall of said blocking rotor having a single opening in said exterior surface, the length and the width of said single opening defined by the arcuate pattern of the rotation of said displacement rotor blades.

5. The flowmeter as claimed in claim 1, wherein said blocking rotor is a solid cylinder, the exterior surface of said blocking rotor having a single recess in said exterior surface, said recess being of sufficient length, width and depth to cooperate with the arcuate pattern of the rotation of said displacement rotor blades without interference.

6. The flowmeter as claimed in claim 1, wherein said blocking rotor has an angled sidewall edge.

7. The flowmeter as claimed in claim 1, wherein said displacement rotor is a cylinder of substantially similar radius to said blocking rotor, said blade extending from said displacement rotor to create sealing means with said blocking rotor and the interior surface of said fluid chamber during the rotational cycle of the rotors.

8. The flowmeter as claimed in claim 1, wherein said displacement rotor is hollow.

9. The flowmeter as claimed in claim 1, wherein said displacement rotor is solid.

10. The flowmeter as claimed in claim 1, wherein said rotors have front and rear journals, said rotors mounted to said meter by said rear journals being inserted through voids in a rear cap and said front journals being inserted through voids in a gear housing plate.

11. The flowmeter as claimed in claim 1, wherein said rotors are recess mounted in said rear plate and said gear housing plate.

12. The flowmeter as claimed in claim 1, wherein said inlet is comprised of an inlet opening, an inlet channel and an inlet port, and said outlet is comprised of an outlet opening, an outlet channel and an outlet port, said inlet port and said outlet port being of greater size than said inlet opening and said outlet opening, said inlet channel and said outlet channel crossing over during connection of said inlet opening to said inlet port and said outlet port to said outlet opening, said inlet opening located adjacent to said outlet displacement chamber and said outlet opening located adjacent to said inlet displacement chamber.

13. A positive displacement flowmeter blocking rotor comprising a cylinder having two endplates and a sidewall, said sidewall having a single opening of sufficient length, width and depth to cooperate with the arcuate pattern of the rotation of said displacement rotor blades without interference.

14. The blocking rotor as claimed in claim 13, wherein said cylinder is hollow.

15. The blocking rotor as claimed in claim 13, wherein said sidewall has an angled edge.

16. The blocking rotor as claimed in claim 13, wherein said cylinder is solid.

17. A positive displacement flowmeter displacement rotor comprising a cylinder of substantially the same radius as said blocking rotor, said blade extending therefrom to create a sealing means with said blocking rotor and said interior surface of said fluid chamber during the rotational cycle of said rotors.

18. The displacement rotor as claimed in claim 17, wherein said cylinder is hollow, said blade extending from the interior surface of said displacement rotor and extending through said opening.

19. The displacement rotor as claimed in claim 17, wherein said blade divides said cylinder symmetrically.

20. The displacement rotor as claimed in claim 17, wherein said blade is thicker at the distal end.

21. The displacement rotor as claimed in claim 17, wherein said cylinder is solid.

22. The displacement rotor as claimed in claim 21, wherein there are more than one blade.

* * * * *